US009591435B2

(12) United States Patent
Nguyen et al.

(10) Patent No.: US 9,591,435 B2
(45) Date of Patent: Mar. 7, 2017

(54) COMMUNICATIONS VIA A RECEIVING DEVICE NETWORK

(71) Applicant: EchoStar Technologies L.L.C., Englewood, CO (US)

(72) Inventors: Phuc H. Nguyen, Parker, CO (US); Christopher William Bruhn, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/985,248

(22) Filed: Dec. 30, 2015

(65) Prior Publication Data

US 2016/0112827 A1  Apr. 21, 2016

Related U.S. Application Data

(62) Division of application No. 14/134,726, filed on Dec. 19, 2013, now Pat. No. 9,253,591.

(51) Int. Cl.
*H04M 1/00* (2006.01)
*H04W 4/00* (2009.01)
*H04W 76/02* (2009.01)
*H04W 84/12* (2009.01)
*H04W 88/16* (2009.01)
*H04W 84/18* (2009.01)
*H04W 88/06* (2009.01)

(52) U.S. Cl.
CPC ......... *H04W 4/008* (2013.01); *H04W 76/023* (2013.01); *H04W 84/12* (2013.01); *H04W 84/18* (2013.01); *H04W 88/06* (2013.01); *H04W 88/16* (2013.01)

(58) Field of Classification Search
CPC ......... H04N 21/4126; H04N 21/43637; H04N 21/485; H04N 21/4122; H04N 21/4316; H04N 21/43615; H04N 21/436; H04N 21/8173; H04N 21/42208; H04N 21/43622; H04N 21/4363; H04N 21/4381; H04N 5/4403
USPC ...................................... 455/552.1
See application file for complete search history.

(56) References Cited

U.S. PATENT DOCUMENTS

| | | | |
|---|---|---|---|
| 2009/0233542 A1* | 9/2009 | Gratton | H04H 60/80 455/3.06 |
| 2010/0058408 A1 | 3/2010 | La Freniere et al. | |
| 2010/0303021 A1* | 12/2010 | Cattani | H04M 7/1215 370/329 |

* cited by examiner

*Primary Examiner* — Kwasi Karikari
(74) *Attorney, Agent, or Firm* — Seed IP Law Group LLP (57) ABSTRACT

A receiving device system arranged to distribute voice communications includes first and second receiving devices, each having a personal area network (PAN) transceiver, a programming transceiver to receive multimedia content, and a local area network (LAN) transceiver. The second receiving device is configured to accept input data via its PAN transceiver from a communications device, initiate communications with the first receiving device via the LAN, and communicate voice data received via the second PAN transceiver to the first receiving device via the LAN. The voice data is passed to a communications device via the PAN transceiver of the first receiving device. Users associated with each of the two communications devices may carry on a voice conversation via voice data being passed through each of the two receiving devices.

20 Claims, 6 Drawing Sheets

COMMUNICATIONS VIA A RECEIVING DEVICE NETWORK

CROSS-REFERENCE TO RELATED APPLICATION

The present application is a divisional of U.S. patent application Ser. No. 14/134,726, filed on Dec. 19, 2013, which is hereby incorporated by reference in its entirety.

BACKGROUND

Technical Field

The present disclosure generally relates to services associated with voice communications and, more particularly, but not exclusively, relates to voice communications passed through at least two receiving devices.

Description of the Related Art

Receiving devices such as set top boxes typically receive television or other multimedia program content from one or more program providers. The receiving devices perform some amount of processing upon the received program content and pass the processed program content to one or more presentation devices such as a television. Each receiving device in a location such as a home may maintain one or more connections to one or more program providers. Examples include satellite connections, cable connections, Internet connections, recorded media connections, and the like. Multiple receiving devices within a location may share such connections to obtain program content.

Some or all of the receiving devices of a location may be interconnected within a local area network using, for example, wired or wireless Ethernet network modules, HOMEPLUG modules, Bluetooth modules, WiFi modules, coaxial cable, and the like. The interconnected receiving devices may communicate program-related data with each other utilizing the local area network.

Mobile communications devices have become ubiquitous in everyday life. People use wireless mobile communications devices throughout the entire day, and people often have their mobile devices nearby when they are watching a television program or other program content delivered by a receiving device to a presentation device. In many cases, two people in different locations are watching the same program. During the course of watching the program, one person may want to talk to the other person. The proliferation of mobile communications devices enables the conversation to take place without either person moving from their current position in proximity to a device that is presenting the program.

BRIEF SUMMARY

A new communications system passes voice data via a receiving device network. Mobile communications devices (e.g., smart phones) are paired with the receiving devices (e.g., set top boxes) found in many homes and businesses.

The mobile device user is able to initiate a voice call via a receiving device. The voice data associated with the call is communicated from a first mobile device to a first receiving device via a first network. The first receiving device communicates the voice data to a second receiving device via a receiving device network. And the second receiving device communicates the voice data to a second mobile device via a second network.

The first and second networks may be personal area networks such as formed between Bluetooth-enabled devices. The receiving device network may be implemented via a local area network (LAN), a wide area network (WAN), or via some other network that permits the first and second receiving devices to uniquely identify each other and bi-directionally communicate data.

A receiving device system arranged to distribute voice communications may be summarized as including a first receiving device, which has a first personal area network (PAN) transceiver arranged for direct communications with a selected first communications device via a first PAN, a programming transceiver arranged to receive multimedia content, and a first local area network (LAN) transceiver. The receiving device system may also include a second receiving device, which has a second LAN transceiver arranged for communications with the first LAN transceiver and a second PAN transceiver arranged for direct communications with a selected second communications device via a second PAN. The second receiving device is further arranged to accept input data associated with the first receiving device via the second PAN from the selected second communications device, initiate communications over a LAN with the first receiving device via the second LAN transceiver, and communicate voice data received via the second PAN to the first receiving device via the LAN.

Embodiments of a first receiving device to receive multimedia programming are configured to output video data and audio data to at least one presentation device and further configured to communicate voice data between the first receiving device and a second receiving device. The embodiments of the first receiving device may be summarized as including a transceiver module having at least one communications circuit and a processor module coupled to the transceiver module. The processor module is configured to direct communications between the first receiving device and a second receiving device, direct communications between the first receiving device and at least one external device, the at least one external device having an audio input circuit and an audio output circuit, and receive a call request from the at least one external device, the call request identifying the second receiving device.

A method to communicate voice data using at least three non-overlapping networks may be summarized as including communicating voice data between a first communications device and a first receiving device via a first personal area network, the first receiving device arranged to present first programming content to a first presentation device, communicating the voice data between the first receiving device and a second receiving device via a receiving device network, the second receiving device arranged to present second programming content to a second presentation device, and communicating the voice data between the second receiving device and a second communications device.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
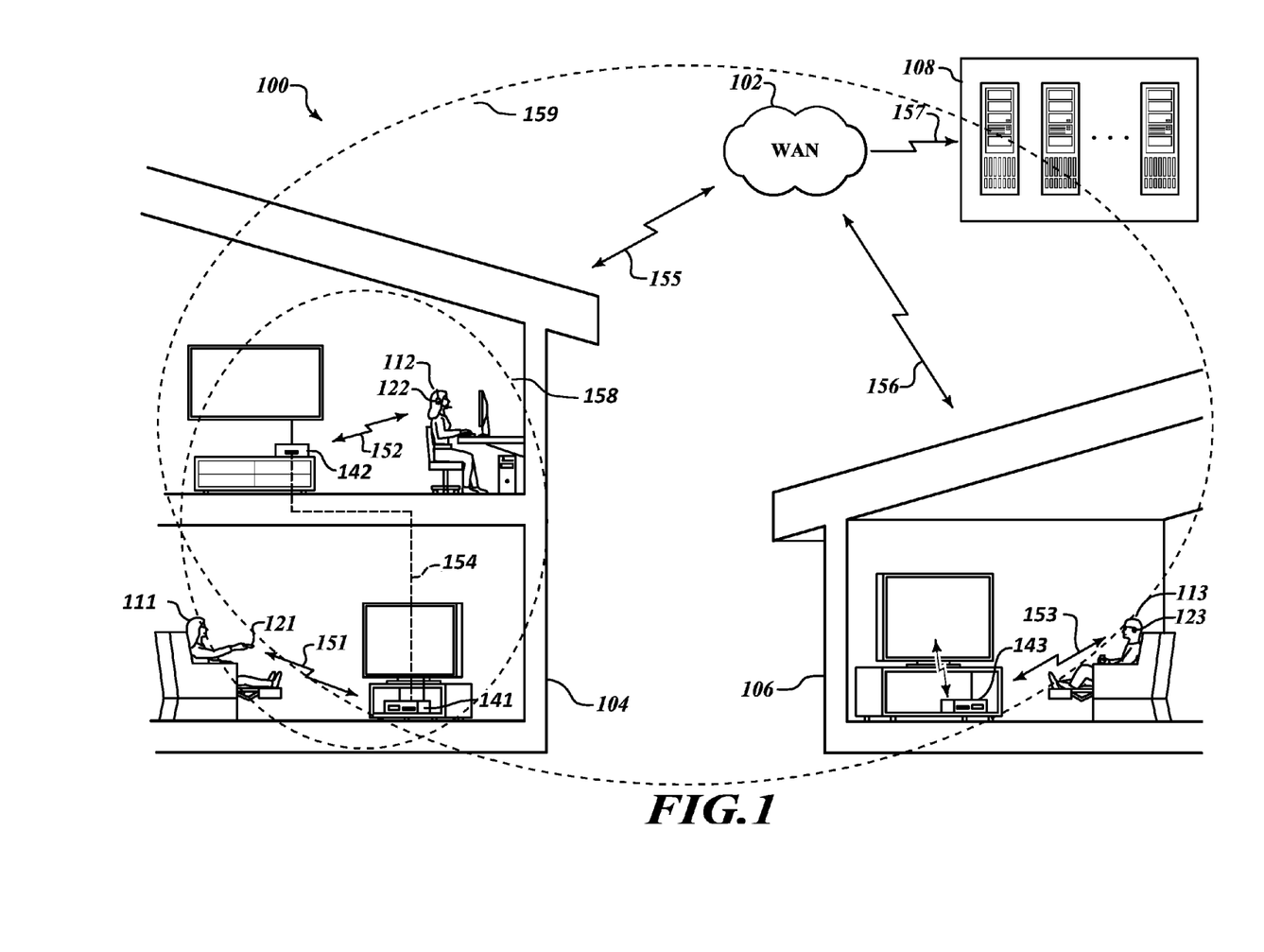
FIG. 1 illustrates at least two embodiments of a system to communicate voice data via a receiving device network.

FIG. 1 illustrates a system to communicate voice data over a receiving device network 100. The system 100 illustrates two distinct homes in a neighborhood, but other buildings in other geographic areas are also contemplated. A first premises 104 is a home where people, such as a family, live. A second premises 106 is also a home where different people live, such as a different family.

In the first premises 104, a first user 111 is reclining in a chair and watching a television program displayed via a presentation device via a first receiving device 141. The first user 111 is holding a first communications device 121 (i.e., a remote control). The first communications device 121 communicates data between the first communications device 121 and the first receiving device 141. The data stream communicated between the first communications device 121 and the first receiving device 141 is represented by 151. In one embodiment, the first user 111 is a mother in the family.

A second user 112 is present in the first premises 104. The second user 112 may be a daughter in the family. The daughter 112 in the embodiment of FIG. 1 is working on homework in an upstairs room of the premises 104. The daughter is wearing a personal area network (PAN) communications device 122. Within the embodiment of FIG. 1, the PAN communications device 122 may be considered the second communications device.

The PAN communications device 122 in the embodiment may conform to a Bluetooth protocol, an IEEE wireless protocol, or another PAN protocol. Often, the second communications device 122 is paired with a mobile telephone device (not shown). The second communications device 122 facilitates voice communications from the user 112, through the mobile telephone device, to another telephone device, via a cellular network.

In the upstairs room of the first premises 104 of FIG. 1, a second receiving device 142 is coupled to a presentation device. The second receiving device 142 is receiving power, but the second receiving device 142 may or may not appear "on," and the second receiving device may or may not be providing content to an associated presentation device. That is, the receiving device 142 may be in an active state or a standby state. The second communications device 122 communicates data between the second communications device 122 and the second receiving device 142. The data stream communicated between the second communications device 122 and the second receiving device 142 is represented by 152.

In the second premises 106, another user, third user 113, is reclining in a chair. The third user 113 is wearing a PAN communications device 123. Within the embodiment of FIG. 1, the PAN communications device 123 may be considered a third communications device. The PAN communications device 123 may be substantially like the PAN communications device 122 worn by the daughter 112 in premises 104.

In a conventional implementation, the daughter 112 (i.e., the second user) may carry on a telephone conversation with the third user 113 via one or more cellular telephone networks. Each of the second and third users 112, 113 produces and hears audio data. The audio data is converted to and from digital data via the respective PAN communications device 122, 132. Each PAN communications device 122, 132 is paired with a respective mobile telephone device (not shown) that passes the digital data across a telecommunications network.

Nearby the third user 113 in the second premises 106 of FIG. 1, a third receiving device 143 is coupled to a presentation device. The third communications device 123 is arranged to communicate data between the third communications device 123 and the third receiving device 143. The data stream communicated between the third communications device 123 and the third receiving device 143 is represented by 153.

A wide area network (WAN) 102 is illustrated in FIG. 1. The WAN 102 facilitates communications 155 to and from devices of the first premises 104. The WAN facilitates communications 156 to and from devices of the second premises 106. Other computing devices such as computing server resources 108 may also be part of the system to communicate voice data over a receiving device network 100. The WAN 102 facilitates communications 157 to and from the computing server resource 108.

In some cases, receiving devices may be associated with the computing server resource 108. The computing server resource 108 may be referred to as "cloud services," "cloud-based computing," "server farms," or other similarly functional external services. In some cases, the computing server resource 108 is accessed by the receiving devices via the WAN 102. The computing server resource 108 may be used by the receiving devices to store information received or generated within the receiving devices. In this way, other devices that are remote from one receiving device may have access to the stored information. In one embodiment, information related to particular identification details of many receiving devices is stored within the computing server resource 108.

WAN 102 includes wired and wireless network communications mediums. WAN 102 may encompass "the Internet," land-line based telecommunication networks, cellular based communications networks, and other communications networks configured to operate over large geographic areas and in addition or in the alternative, configured to communicatively connect many devices. WAN 102 may include fiber optic cables, copper wire data paths, satellite communications equipment components, cable programming communications equipment components, and other data communications equipment components.

Also evident in FIG. 1 is a receiving device network communications path 154. A receiving device network includes two or more receiving devices communicatively coupled via one or more communications mediums.

In FIG. 1, one embodiment of a receiving device communications network includes first receiving device 141, second receiving device 142, and communications path 154. This embodiment may be called a local receiving device communications network 158. The communications path 154 facilitates data communications between the two receiving devices. Communications paths of the receiving device communications network may include components that follow a particular protocol, for example, ZigBee/RF4CE, wired and wireless protocols compliant with an IEEE standard (e.g., IEEE 802.11 WiFi, IEEE 802.3 Ethernet, and the like), Bluetooth, Universal Serial Bus (USB), cellular, multimedia over coax (MoCA), and others.

In the local receiving device network 158 embodiment of FIG. 1, the first and second receiving devices 141 and 142 are network aware of each other via one or more unique identifiers associated with each respective receiving device. Stated differently, each receiving device is uniquely identified within the local receiving device network 158, and the unique identifier can be used to route data communications to and from the associated receiving device. A media access control (MAC) address may be a unique identifier within a local receiving device network 158. Other unique identifiers of receiving devices within a local receiving device network 158 may include an assigned name (e.g., "Living Room Set Top Box"), some other character-based combination, a storage medium identifier (e.g., a hard drive ID), a cellular chipset identifier such as an International Mobile Station Equipment Identity (IMEI), a serial number, or some other identifier.

In FIG. 1, a second embodiment of a receiving device communications network 159 includes first, second, and third receiving devices 141, 142, and 143, along with communications paths 154, 155, and 156. This second embodiment may be called a wide receiving device communications network 159. Along the lines of the local receiving device network 158 embodiment, each receiving device in a wide receiving device network 159 is uniquely identified within the network. In some cases, a unique identifier within a local receiving device network 158 is used as a partial unique identifier in a wide receiving device network 159. For example, a unique identifier in a local receiving device network 158 may be joined with a unique identifier for the premises. The unique identifier for the premises may include one or more of an Internet protocol (IP) address, a service provider account number, a receiving device type and serial number, or some other identifier.

In FIG. 1, a local receiving device network 158 within the first premises 104 may include a first receiving device 141 uniquely identified within the network 158 as "Living Room Set Top Box." A second receiving device 142 may be uniquely identified within the network 158 as "Upstairs Set Top Box." The express identifiers or a digital value associated with each respective identifier can be used by each receiving device to communicate data to and from another receiving device.

Further in FIG. 1, a wide receiving device network 159 may uniquely identify the first receiving device 141 by joining a unique account name, such as "Premises #1" with the local receiving device network ID, "Living Room Set Top Box." The second receiving device 142 may be uniquely identified by joining the unique account name "Premises #1" with the local receiving device network ID, "Upstairs Set Top Box." A third receiving device 143 may be uniquely identified by only the unique account name "Premises #2" since no local receiving device network is embodied in the second premises 106, however, a local receiving device network ID or some other identifier may also be configured. Of course it is recognized that a wide receiving device network identifier is not limited to a unique account name, a specific IP address, or any other specific identifier. Instead, the wide receiving device network identifier can take any desirable form.

The network-wide unique identifiers associated with each receiving device in a local receiving device network 158 and in a wide receiving device network 159 are stored as digital data in one or more computing devices. For example, in a local receiving device network 158, the identifier of each device in the network may be stored locally within each receiving device of the network 158. In a wide receiving device network 159, the identifier of each device may be stored in whole or in part in a WAN-accessible computing device such as computing server resource 108.

Two non-limiting examples of a system to communicate voice data over a system to communicate voice data over a receiving device network 100 are now described. In a first example, the first premises 104 includes a local receiving device network 158 comprised of at least two receiving devices 142, 142 and one communications path 154 coupled to each receiving device in the network. A first user 111, the mother, watches TV while holding a first communications device 121, a remote control. At some point, the mother wants to communicate to a second user 112, the daughter, who is in an upstairs room. The mother 111 may send a notification to the daughter 112 via the receiving devices 141, 142. The remote control 121 can be used to facilitate access to an electronic identity of the daughter. The receiving devices 141, 142 may communicate to recognize that the daughter 112 is currently in proximity to the second receiving device 142. Upon such recognition, the first receiving device 141 may communicate to the second receiving device 142 by employing the unique identifier "Upstairs Set Top Box" and sending data across communications path 154.

Upon receiving a request to communicate from the first receiving device 141, the second receiving device 142 will take action to notify the daughter 112 that an incoming call waiting for an acknowledgement. The action may include waking the receiving device 142 from a sleep or standby mode if necessary, presenting certain identifying information on a presentation device, blinking visual output identifiers, playing sounds or tones, or some other action. In the example, the daughter 112 may acknowledge the notification, pair her communications device 122 with the second receiving device 142, and conduct a voice conversation with the mother 111. The voice data is passed across communications paths 151, 152, and 154.

In a second non-limiting example, the first premises 104 includes a local receiving device network 158 comprised of receiving devices 141, 142 and communications path 154 coupled to receiving devices 141, 142. A user 112, the daughter, is in an upstairs room in proximity to the second receiving device 142. Another user 113 is in a room of the second premises 106 in proximity to another receiving device 143. A wide receiving device network 159 comprises three receiving devices 141, 142, 143 and communications paths 154, 155, and 156.

In the second non-limiting example, the third user 113 in premises 106 is watching a program presented via the third receiving device 143. The third user 113 wants to communicate with the second user 112, the daughter, who is in a different premises 104. The third user 113 will attempt to initiate the communications via the third receiving device 143.

To facilitate the initiation of the call, the third communications device 143 may retrieve data locally or retrieve data from a memory of a computing server resource 108. The retrieved data may include an identifier of premises 104 and a local identifier of "Upstairs Set Top Box." The retrieved data may also be an identifier of a mobile device associated with the second user 112. By combining the identifying information, the third receiving device 143 is configured to send data to the second receiving device 142. In a sequence along the lines of a local receiving device network embodiment, the second user 112 is notified of a request for a voice communications with the third user 113, and the voice data associated with the communications may be communicated across communications paths 152, 153, 155, and 156. Thus, even though both user 113 and user 112 have mobile telephone devices, the voice conversation is conducted without using the mobile telephone devices. Instead, the voice conversation is conducted across a wide receiving device network 159.

Figure 2:
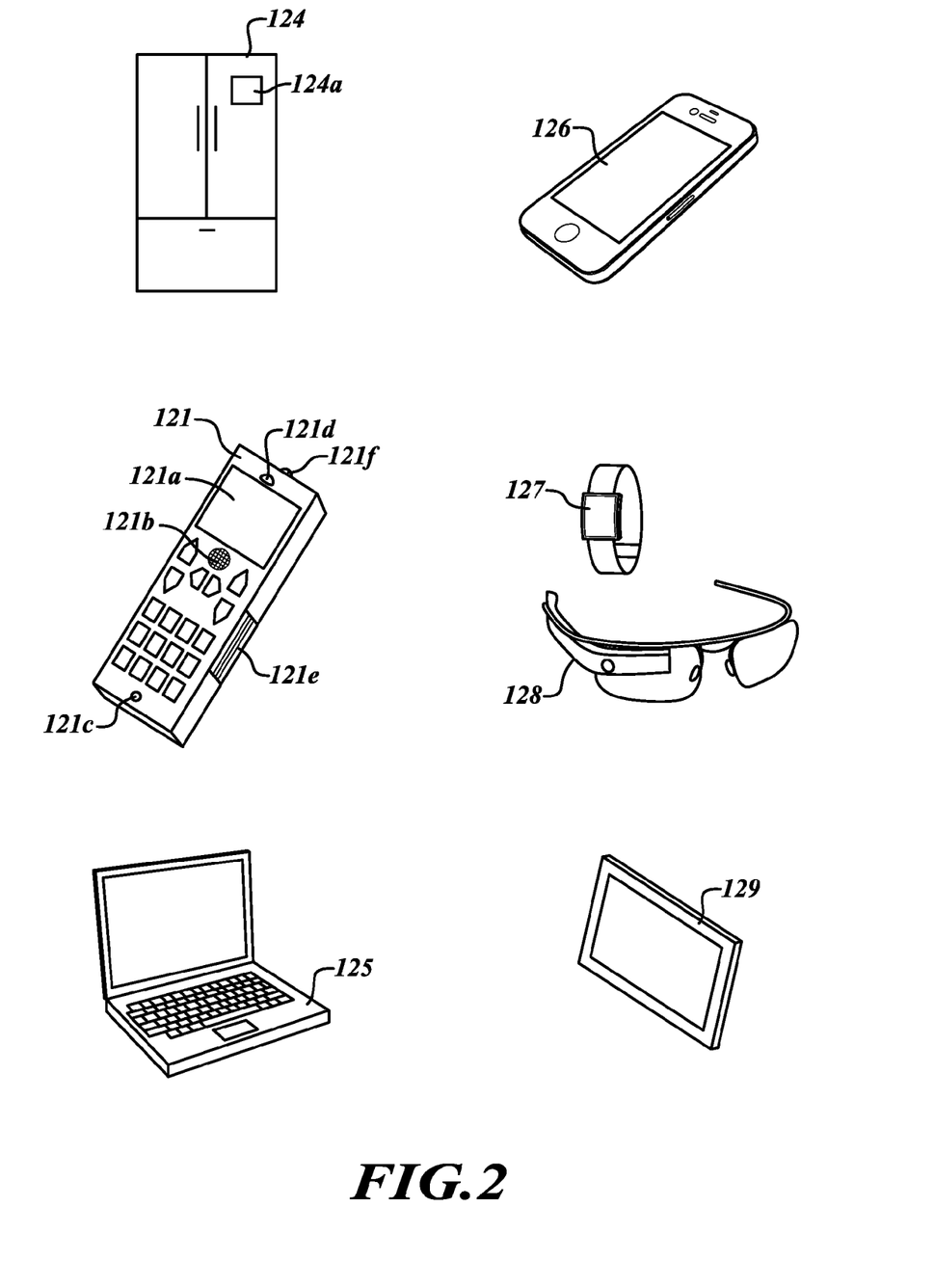
FIG. 2 illustrates a non-limiting set of communications devices that may be used in a system to communicate voice data over a receiving device network.

FIG. 2 illustrates a non-limiting set of communications devices that may be used in a system to communicate voice data over a receiving device network 100. The remote control communications device 121 of FIG. 1 is illustrated in more detail in FIG. 2. The personal area network (PAN) communications devices 122, 123 of FIG. 1 are not illustrated in FIG. 2, but other communications devices are. A smart appliance 124 is illustrated in FIG. 2. The smart appliance 124, a refrigerator in this case, includes an input/output module 124a. Other communications devices illustrated in FIG. 2 include a personal computer 125, a mobile telecommunications device (i.e., a "smartphone") 126, a smart watch wearable computer 127, a smart glasses wearable computer 128, and a tablet computer 129. Other personal computing devices may also be used in the system 100 and function as all or part of a communications device.

Communications device 121 is a remote control device. The communications device 121 may be used to direct operations in a receiving device such as displaying a television programming guide, selecting particular programming for presentation, ordering restricted content from a programming provider, and the like. The communications device 121 may include other optional features such as a display 121a, an audio output module 121b, an audio input module 121c, a visual indicator module 121d, a tactile output module 121e, and a transceiver 121f.

The remote control communications device 121 includes modules configured to facilitate communications of voice data over a receiving device network. The display 121a, in conjunction with input features of the communications device 121, may be used to identify local or remote users available for voice communications. The display 121a may also be used to communicate a status of a voice communications and other information. The audio input and output modules 121b, 121c allow a user to speak and hear voice communications data. Electronic circuitry facilitates the conversion between signals in an audio spectrum and signals in a digital spectrum. A visual indicator 121d may include one or light sources such as an LED, LCD, incandescent bulb, or some other visual indicator. When another user is requesting initiation of a voice conversation, the visual indicator module 121d may provide an alert to the user. A tactile feedback module 121e may be a vibrator or other source of tactile feedback. One or more of the visual indicator module 121d, tactile output module 121e, and audio output module 121b may provide a notification alert to an associated user. Communications of digital data between the communications device 121 and a receiving device is passed through the transceiver 121f, which is described herein.

The communications devices of FIGS. 1 and 2 generally include one or more of an audio input module and an audio output module along with electronic circuitry configured to convert audio data to digital data and in addition or in the alternative, to convert digital data to audio data. A single module 124a configured for input and output is illustrated in the smart appliance 124, however, it is recognized that the other illustrated computing devices also include either or both of input and output audio capability.

The communications devices of FIGS. 1 and 2 also include a transceiver configured for short range communications. The transceiver may include components that follow a particular protocol, for example, ZigBee/RF4CE, wired and wireless protocols compliant with an IEEE standard (e.g., IEEE 802.11 WiFi, IEEE 802.3 Ethernet, and the like), Bluetooth, Universal Serial Bus (USB), cellular, multimedia over coax (MoCA), and others. The transceivers of the communications devices of FIGS. 1 and 2 may be cooperatively participate in a personal area network with a receiving device. The transceivers of the communications devices of FIGS. 1 and 2 cooperate to enable communications paths 151, 152, and 153 of FIG. 1

Figure 3A:
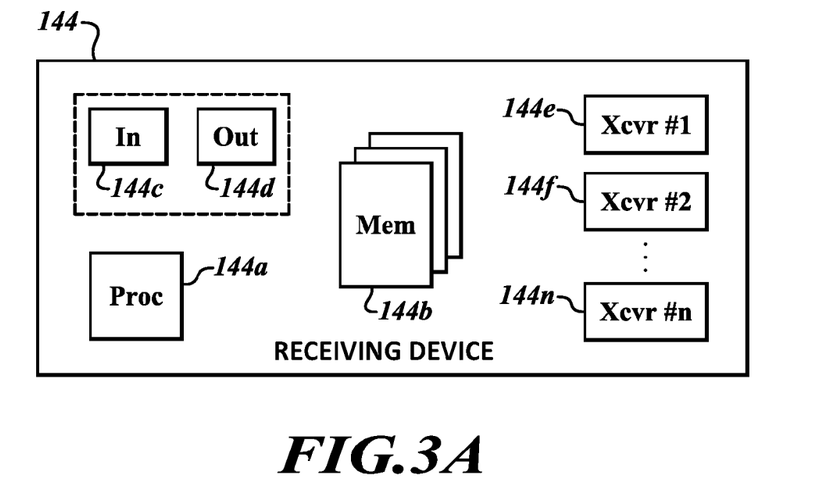
FIG. 3A is a receiving device block diagram.
Figure 3B:
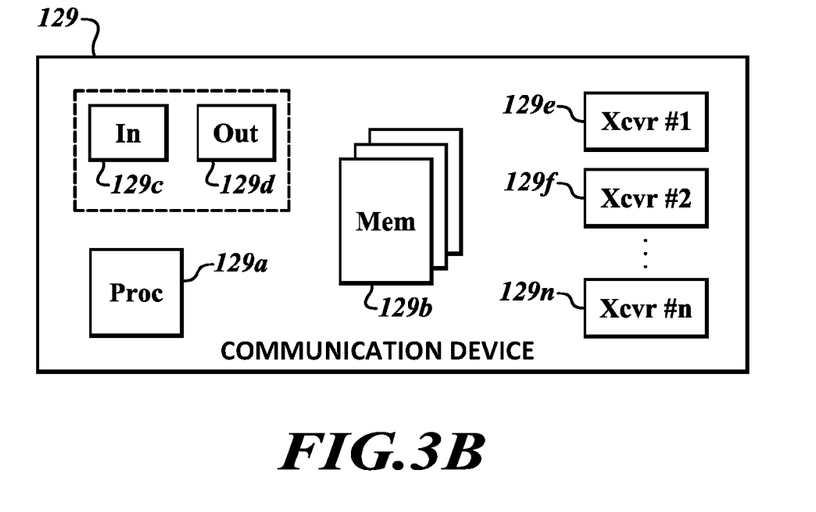
FIG. 3B is a communications device block diagram.

FIG. 3A is a receiving device 144 block diagram. FIG. 3B is a communications device 129 block diagram. The receiving device 144 may be a receiving device of the type 141-143 illustrated in FIG. 1. The communications device 129 may be a communications device of the type 121-128 illustrated in FIGS. 1 and 2.

The receiving device 144 of FIG. 3A may be employed in a system to communicate voice data over a receiving device network 100 (FIG. 1). Receiving devices 144 may be interchangeably referred to by a general device description such as a "television converter," "receiver," "set-top box," "television receiving device," "television receiver," "programming receiver," "television recording device," "satellite set-top box," "satellite receiver," "cable set-top box," "cable receiver," and/or "television tuner." Accordingly, the receiving device 144 may be any suitable converter device or electronic equipment that is operable to receive programming. Further, the receiving device 144 may itself include user interface devices, such as buttons or switches. In many applications, the receiving device 144 may be controlled by a remote control device 121 (FIG. 2) in such a manner as to provide enhanced functionality and/or an enhanced presentation of the programming to a user.

The receiving device 144 of FIG. 3A includes a processor 144a. The processor 144a may be a single processing unit or a formation of multiple processing units. The processing unit 144a may be or include field programmable gate arrays (FPGA), application specific integrated circuits (ASIC), digital signal processors (DSP), central processing units (CPU), or other like devices. The processing unit 144a of a receiving device 144 may be broadly referenced herein as a CPU. That is, the processor 144a may be one or more of an FPGA, an ASIC, a DSP, or a CPU.

A memory 144b is included in the receiving device 144. Memory 144b comprises any combination of volatile and non-volatile non-transitory computer-readable media (CRM) for reading and writing. Volatile computer-readable media includes, for example, random access memory (RAM). Non-volatile computer-readable media includes, for example, read only memory (ROM), magnetic media such as a hard disk, an optical disk drive, a flash memory device, a CD-ROM, and/or the like.

Stored in memory 144b may be a particular collection of software instructions executable by the processing unit 144a in order to carry out some functions of the receiving device 144. The software instructions operatively configure hardware and other software in the receiving device 144 so that voice communications may be passed through a receiving device network. Information related to the receiving device network such as known contacts and other data may be stored in a file system in memory 144b.

The receiving device 144 includes a user interface having an input circuit 144c and an output circuit 144d. The user interface may optionally include visual modules such as an LED module or a display module, and an audio module (i.e., input devices such as a microphone and/or output devices such as speakers). The receiving device 144 may use one or more of the user interface modules to alert, inform, or accept input from a user that is in proximity of the receiving device 144.

The receiving device 144 will typically also one or more transceivers 144e-144n. The transceivers of FIG. 3A may be implemented in a single transceiver circuit or multiple transceiver circuits. For example, the receiving device 144 may include a first transceiver 144e that is comprised of a satellite receiver front-end, while the second transceiver 144f may include a WiFi chipset, a Bluetooth chipset, a ZigBee/RF4CE chipset, an infrared output device and detection device, and other separately identifiable logic modules. Generally speaking, the transceivers of FIG. 3A are illustrated as having either programming (e.g., audio/visual television programming) capability or personal area network (PAN) capability, but other configurations of modules are recognized.

A first transceiver 144e, for example, may be configured to receive programming. In some cases, the transceiver 144e includes circuitry for receiving and processing satellite signals. In other cases, the transceiver 144e includes circuitry for receiving and processing cable-delivered signals. In still other cases, transceiver 144e includes circuits for receiving and processing over-the-air (OTA) signals. The transceiver 144e enables the receiving device to receive programming that can be processed and delivered to a presentation device.

A second transceiver 144f of the receiving device 144 of FIG. 3A is configured to couple with a transceiver of a communications device 129 (FIG. 3B). That is, in embodiments of the system to communicate voice data over a receiving device network 100, the receiving device 144 and the communications device 129 have at least one corresponding transceiver. The corresponding transceivers are configured to communicate with each other such that information may be passed between the communications device 129 and the receiving device 144. In a system to communicate voice data over a receiving device network 100, the receiving device 144 is configured to receive, process, and pass voice data.

The second transceiver 144f of receiving device 144 may conform to a WiFi protocol, Bluetooth protocol, ZigBee/RF4CE protocol, IEEE 1394 FireWire protocol, USB protocol, Ethernet protocol, Multimedia-Over-Coax Alliance (MoCA) protocol, infrared protocol, ultra-high frequency (UHF), or another wired or wireless protocol. The transceiver 144f of receiving device 144 and a transceiver of the communications device generally cooperate in a personal area network (PAN) environment or even a peer-to-peer environment to unidirectionally or bidirectionally pass information.

Additional transceivers 144n may be constituted as the second transceiver 144f. In such embodiments, a receiving device 144 may be concurrently coupled to two or more communications devices.

The transceivers 144e-144n may be individually constituted or the transceivers may be virtually constituted. That is, in some cases, each transceiver includes electronic circuits dedicated to that transceiver. In other cases, electronic circuits are shared such that the appearance of multiple transceivers is presented to processing circuitry that passes data through the transceivers when instead, the virtual transceivers merely share fewer physical electronic circuits than there are virtual transceivers.

Communications device 129 of FIG. 3B may be employed in a system to communicate voice data over a receiving device network 100 (FIG. 1). The communications device 129 of FIG. 3B includes a processor 129a. The processor 129a may be of the type 144a generally described with respect to FIG. 3A. That is, the processor 129a may be one or more of an FPGA, an ASIC, a DSP, or a CPU. The processors 129a, 144a may be, but are not necessarily, identical.

A volatile and/or non-volatile computer readable memory 129b is included in the communications device 129. The memory 129b is of the type 144b generally described with respect to FIG. 3A. The memory 129b may be identical to the memory 144b, or the memory 129b may be different. In some cases, the memory 129b includes components that are internal to the communications device 129, external to the communications device 129, or both internal and external to the communications device 129.

A particular collection of software instructions executable by the processing unit 129a may be stored in memory 129b in order to carry out some functions of the communications device 129. The software instructions operatively configure hardware and other software in the communications device 129 so that voice communications may be passed to and from a receiving device 144. The memory 129b may be configured with a file system. The memory 129b may store information related to a receiving device network such as identifier information of known contacts, parameters to form a PAN with a receiving device, and other data.

The communications device 129 includes a user interface having an input circuit 129c and an output circuit 129d. The input and output circuits 129c, 129d may be of the type 144c, 144d generally described with respect to FIG. 3A. That is, the user interface of FIG. 3B may have input and output modules to alert, inform, or accept input from a user in proximity of the communications device 129.

The communications device 129 will typically also include one or more transceivers 129e-129n. The transceivers of FIG. 3B may correspond to one or more transceivers of FIG. 3A. That is, a communications device 129 may be concurrently coupled to two or more other devices such as a receiving device 144 and a mobile telephone device (not shown).

Figure 4A:
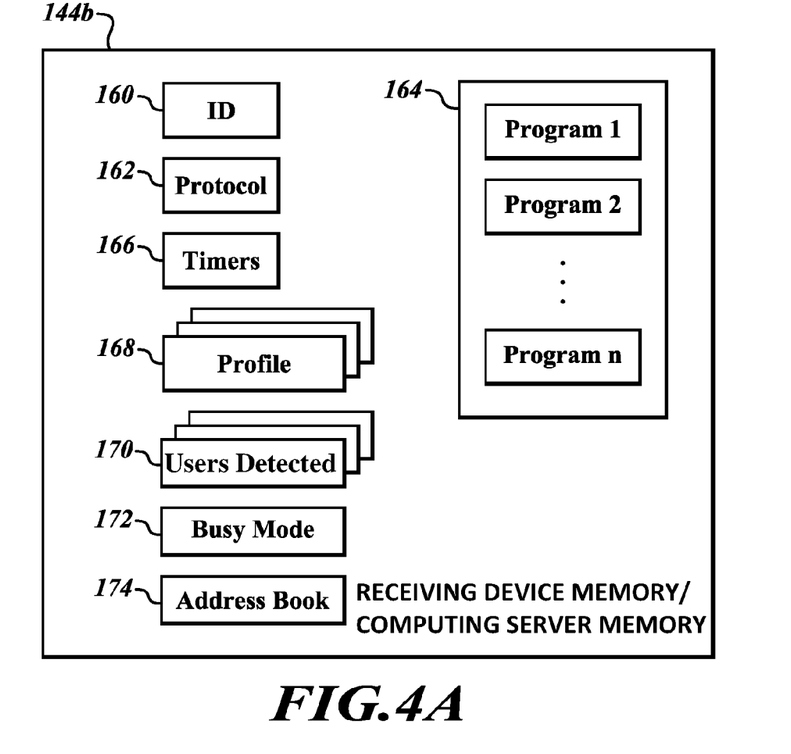
FIG. 4A illustrates one embodiment of a memory configured in a receiving device and in addition, or in the alternative, in a computing server resource.
Figure 4B:
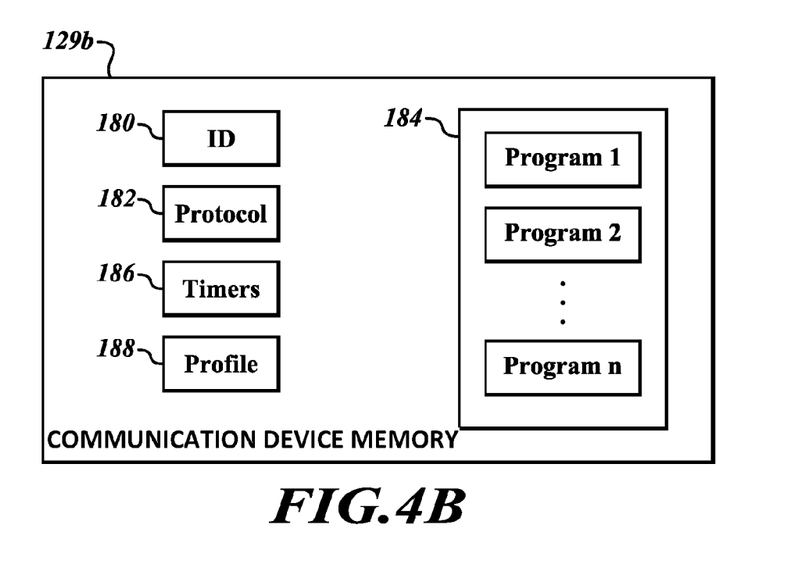
FIG. 4B illustrates one embodiment of a memory configured in a communications device.

FIG. 4A illustrates one embodiment of a memory 144b configured in a receiving device 144 and in addition, or in the alternative, in a computing server resource 108 (FIG. 1). FIG. 4B illustrates one embodiment of a memory 129b configured in a communications device 129. The configurations in the respective memories 144b, 129b enable various features of a system to communicate voice data over a receiving device network 100 discussed herein.

The memory 144b of FIG. 4A includes a plurality of optional storage modules including an identification module 160, a protocol module 162, an executable software program module 164, a timers module 166, a profiles module 168, a detected users module 170, a busy mode module 172, and an address book module 174.

In some cases, the memory modules of FIG. 4A are resident in a computing server resource module 108. The identification module 160 may be used to store and distribute identifiers to particular premises and to specific receiving devices. For example, in a wide receiving device network 159 (FIG. 1), one receiving device such as receiving device 143 in premises 106 may seek an identifier of a second premises such as premises 104 or even a second receiving device such as receiving device 142 in premises 104. Whole or partial identifiers that enable the first receiving device to communicate with the second receiving device may be stored in the identification module 160.

In some cases, all of the memory modules of a FIG. 4A are resident in a computing server resource module 108. A receiving device 144 that was not previously enabled to carry out the features of a system to communicate voice data over a receiving device network may retrieve the modules of FIG. 4A and thereby become so enabled.

Some receiving device embodiments include an identification module 160 within memory 144b. In the identification module 160, a receiving device 144 may include an identifier to itself. The identifier to itself may be broadcast to other receiving devices in a local receiving device communications network 158. The identifier to itself may be transmit in response to a specific request for identification from another receiving device, a communications device 129, a computing server resource 108, or from some other device. In many communications, the receiving device 144 that is communicating will include its own identifier in communications data messages to inform a recipient device of the sender.

The identification module 160 may further include identifiers of other receiving devices resident within a local receiving device network 158. The identifiers may be used to send data to users associated with the other receiving devices of the local receiving device network 158.

In some cases, the identification module 160 also stores identifiers of receiving devices that are outside of a local receiving device network 158. For example, as in FIG. 1, a user 113 associated with one receiving device 143 may establish communications with another user 112 associated with another receiving device 142. Initially, the receiving device 143 will learn of a unique identifier of the receiving device 142. The unique identifier may be known to user 113, retrieved from one or more sources such as computing server resource 108, or formed from one or more pieces of data retrieved in other ways. Upon learning of the identifier at least one time, the receiving device 143 may store the unique identifier associated to receiving device 142 within a module 160. Subsequently, if user 113 desires to begin another voice conversation with user 112 through a receiving device network, the unique identifier may be retrieved from the identifier module 160.

Protocol module 162 includes data associated with one or more communications protocols. The module 162 may include information that directs the operations of a transceiver of a receiving device 144. The protocol information may be according to a Bluetooth protocol, a USB protocol, an IEEE-compliant wired or wireless protocol, or some other protocol. For example, the protocol module may store particular pairing identifiers that enable a transceiver of a receiving device 144 to pair with a specific communications device 129 to form a personal area network (PAN).

In some cases, protocol parameters stored in a protocol module 162 are associated with a particular identifier stored in an identifier module 160. In this way, the receiving device 144 may recognize when a particular user is in proximity of the receiving device 144. That is, based on a set of protocol parameters, which may include a certain Bluetooth identity of a certain communications device 129, the receiving device may automatically detect the presence of certain user based on the ability of the receiving device 144 to form a PAN with a communications device 129 associated with the certain user.

A timers module 166 may include hardware parameters associated with one or more timers in a receiving device 144. In some cases, particular users associated with particular communications devices 129 will only accept incoming voice communications requests at certain times. The timers module 166 may store parameters associated with such timers. In other cases, a first user may try to initiate a voice conversation with a second user, and the second user may have set a do-not-disturb status. If the do-not-disturb status is associated with a particular time or with a particular program content, for example a certain television show, the timers module 166 may store parameters associate with an alarm to initiate the voice conversation after the alarm expires.

A profile module 168 may store one or more profiles wherein each profile can be associated with a different communications device 129. Often, a profile includes a set of default data parameters, and the default parameters may be customized. The individual parameters may be customized one at time, or the individual parameters may be customized as a plurality. In some cases, a communications device 128 may communicate one or more of the parameters to the receiving device 144 for storage in a profile module 168.

Table 1 illustrates a non-limiting set of parameters that may be included in a profile and stored in the profile module 168.

TABLE 1

Parameters associated with a profile

| Param | Parameter(s) to: |
|---|---|
| 1. | Couple the communications device to the receiving device |
| 2. | Publish an identifier of the associated user to local receiving devices |
| 3. | Publish an identifier of the associated user to non-local receiving devices |
| 4. | Indicate whether the associated user is busy or available |
| 5. | Indicate when the associated user will become available |
| 6. | Indicate which other users may request a conversation |
| 7. | Indicate when the user is in proximity of the receiving device |
| 8. | Publish programming content the user is watching |
| 9. | Indicate whether the user watching a program can be interrupted |
| 10. | Indicate how the user can be alerted to an incoming call request |
| 11. | Prioritize the associated user amongst other users |

The parameters of Table 1, a set of which is associated with each profile, are used by the receiving device 144 to direct operations in the system to communicate voice data over a receiving device network.

A detected users module 170 may be embodied as a dynamic list in the memory 144b. In some embodiments, the detected users module 170 stores an indicator associated with each profile in the profiles module 168. When a transceiver of the receiving device 144 detects a certain communications device is in proximity, the receiving device 144 may set the indicator associated with the profile. Based on the proximity, and in some cases also based on additional or different parameters, setting the indicator associated with the profile informs other devices of the potential availability of the user for voice communications. In other cases, setting the indicator permits the receiving device to initiate or continue voice data communications to and from the associated communications device.

The proximity detection may be based on the ability of the receiving device transceiver to communicatively couple with the communications device transceiver. The proximity detection may also be based on another manual or automatic mechanism such as a button press, an infrared detection device, a prediction by the receiving device based on past communications sessions, or by some other means.

A busy mode module 172 may be embodied as a dynamic list in the memory 144b. In some embodiments, the busy mode module 172 stores an indicator associated with each profile in the profiles module 168. When the user associated with the particular profile does not want to initiate or continue communications of voice data via a receiving device network, a busy mode may be indicated.

An address book module 174 in the memory 144b may be configured to store one or more identifiers of particular receiving devices, communications devices, premises, users, or some other entity. The identifiers may include one or more digital bits that represent alpha-numeric characters or some other symbol. In some cases, a single identifier uniquely identifies an entity within a receiving device network. In other cases, a combination of two or more identifiers uniquely identifies an entity within a receiving device network. For example, within a local receiving device communications network 158, a name of a receiving device may be sufficient to identify a unique user for a voice conversation. In another case, a receiving device may store multiple profiles, and thus, initiating a voice conversation may include an receiving device identifier and a particular user identifier. Other combinations of identifiers for local and wide receiving device networks are also contemplated.

In many cases, a specific user is associated with one or more communications devices. Accordingly, an identifier to a particular communications device may be used to identify a particular user. When a receiving device 144 detects a certain communications device in proximity, the receiving device may be able to access address book module 174 and identify a particular user associated with the communications device 129. Upon identifying the associated user, the receiving device may then update the detected users module 170. In some cases, based on the detection of the user, a voice conversation may be initiated, continued, or terminated.

The programs module 164 may store software instructions executable by a processor, such as processor 144a. The programs of the programs module 164 carry out one or more features of a system to communicate voice data over a receiving device network 100. The programs may be added, deleted, updated, or otherwise modified by a user. Certain programs stored in program module 164 are described herein, for example, with reference to FIGS. 5 and 6.

FIG. 4B illustrates one embodiment of a memory 129b configured in a communications device 129. The memory 129b includes a plurality of optional storage modules including an identification module 180, a protocol module 182, an executable software program module 184, a timers module 186, and a profiles module 188.

The identification module 180 may include an identifier to the communications module 129, an identifier to a user associated with the communications module 129, or some other identifier. For example, the identifier may be a username, one or more parameters to enable a PAN to be formed with a receiving device 144, a unique digital bit sequence, or some other data. In some cases, upon formation of a PAN with a receiving device 144, the receiving device 144 is aware of the communications device identifier. In other cases, after the PAN is formed, the communications device 129 expressly communicates the communications device identifier to the receiving device 144.

Protocol module 182 includes data associated with one or more communications protocols. The module 182 may include information that directs the operations of a transceiver of the communications device 129. The protocol information may be according to a Bluetooth protocol, a USB protocol, an IEEE-compliant wired or wireless protocol, or some other protocol. For example, the protocol module may store particular pairing identifiers that enable a transceiver of the communications device 129 to pair with a nearby receiving device 144 to form a personal area network (PAN).

In some cases, the communications device 129 may form a PAN with many receiving devices 144. For example, as in FIG. 1, the third user 113 is illustrated in proximity to receiving device 143. The protocol module 182 directs communications of a PAN formed between the communications device 123 and receiving device 143. In such a case, an identifier associated with the identification module 180 is communicated to receiving device 143. The receiving device 143 may create a new profile 168, a new address book entry in module 174, and other parameters and module in a memory 144b of receiving device 143 will also be updated. Subsequently, if user 113 physically visits premises 104, receiving devices 141 and 142 may also be similarly updated.

A timers module 186 of communications device memory 129b may store timer parameters associated with the communications device 129. In some cases, the parameters are coupled or otherwise associated with parameters of Table 1. The parameters may be used by the communications device 129 to initiate, maintain, or terminate voice conversations. In addition, or in the alternative, certain data from the timers module 186 may be passed to a receiving device to direct how others may initiate, maintain, or terminate voice conversations with the communications device 129.

A profile module 188 will optionally store parameters as indicated in Table 1. For example, a first parameter indicates how the communications device 129 can be communicatively coupled to a receiving device. The first parameters may include protocol information, identifier information, and other information to enable a PAN to be formed.

One or more second and third parameters direct a receiving device 144 communicatively coupled to the communications device 129 regarding publication of the identity of the communications device in a formed PAN. For example, in some cases, a user associated with the communications device 129 may want other receiving devices in a receiving device network to discover the identity of the user to the coupled receiving device. In some cases, the user does not want the identity to be published at all. In such cases, when the information regarding the PAN between the communications device and the receiving device is not published, other receiving devices are not able to form voice conversations with the user. Some embodiments may selectively publish the identity to only local receiving device networks but not wide receiving device networks. Some embodiments may selectively publish the identity to only certain receiving devices, such a friend list. Some embodiments may selectively publish the identity based on other criteria.

A fourth parameter may indicate whether a user associated with the communications device 129 is busy or not busy. A user may manually set such a parameter. A user may provide criteria by with a busy parameter can be automatically set or cleared. For example, in some cases, a user will determine a particular time of day, day of week, or other time-based criteria where the user will be declared busy. In other cases, a user will be declared busy during a presentation of certain program. Other criteria can also be used to determine when a user is busy or not busy.

A fifth parameter may be used to inform other users via associated receiving devices when a user will become available. For example, in conjunction with a user declaring himself busy during presentation of particular programming content, a parameter may be set to inform others when the programming content presentation will end.

A sixth parameter in Table 1 may include one or more identifiers with which the user associated with the communications device will engage in a voice conversation. The list may positively identify users who can initiate conversations. The list may positively identify users who cannot initiate conversations. Other lists may also be formed.

A seventh parameter may be a simple detection of a particular communications device in proximity to the receiving device. Such a parameter in some cases is applied to make efficient use of programmatic resources. For example, software programs in program modules 164, 184 may quickly use the seventh parameter to continue or terminate certain software programs. Alternatively, or in addition, such a parameter may be used to determine if multiple users are in proximity of a receiving device. In some embodiments, one user will only desire to initiate a voice conversation if two or more other users are in proximity to a certain receiving device. In this case, the one user may know when such a condition is met. For example, a grandchild may only want to initiate a voice conversation if both grandparents are in proximity to a receiving device. The seventh parameter may be used in such cases to alert the grandchild when such a condition is present.

An eighth parameter may be used to inform other users what program content is being presented via a presentation device coupled to an associated receiving device. Such information may be used by others to determine if a voice conversation is desirable.

A ninth parameter may be used to indicate whether or not a user watching a certain program can be interrupted with a voice conversation. The ninth parameter may be used to initiate, maintain, or terminate voice conversations.

A tenth parameter may be used by a receiving device to indicate how the user associated with a communications device coupled to the receiving device in a PAN can be alerted to a request for a voice conversation. For example, in some cases, visual or audio indicators on the receiving device may be enabled and certain outputs to the indicators may be applied. In another example, a receiving device that is in a standby mode may be woken up and indications applied. The receiving device may be directed to present certain content such as a screen overlay on a presentation device. In such examples, the screen overlay may indicate an identity of the user trying to initiate the voice conversation, and the screen overlay may also indicate how the request can be acknowledged. In still other examples, the tenth parameter may direct how the communications device can provide visual, audio, tactile or some other indicators to an associated user.

An eleventh parameter may be used to prioritize voice conversations between certain users. For example, in cases where two or more users each associated with a respective communications device are in proximity to the same receiving device, contention for voice conversations may be addressed by prioritizing the different users. In one case, the prioritization is automatically set based on when different communications devices form a PAN with the receiving device. In another case, the priority can be manually set.

The parameters associated with the profile module 188 and associated with one or more individual profiles stored in profile module 168 may include some or all of the parameters called out in Table 1. More or fewer parameters may also be included. The parameters may be manually or programmatically configurable by a user, for example via a user interface.

Figure 5:
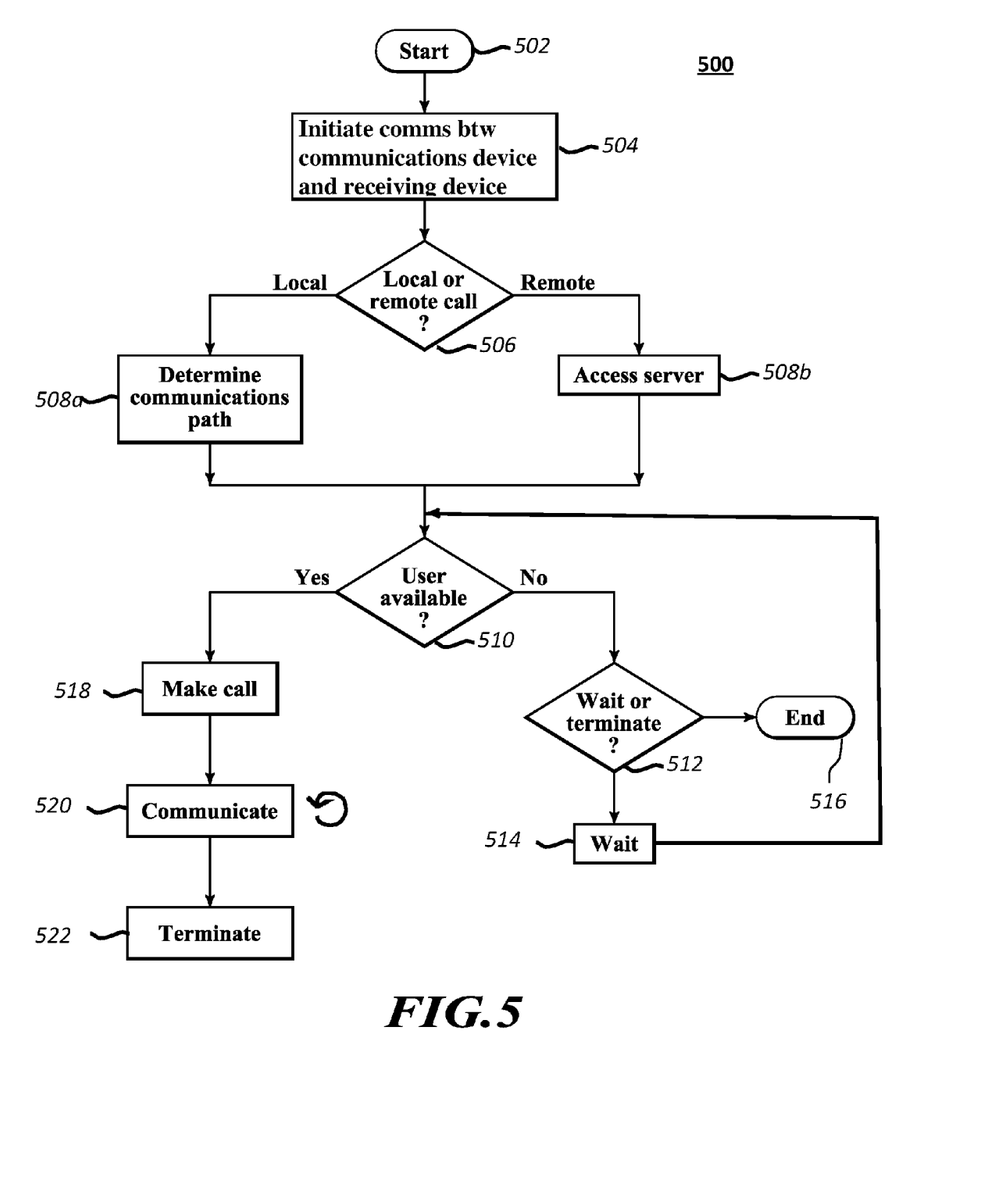
FIG. 5 is a flowchart illustrating a method of a system to communicate voice data over a receiving device network.

FIG. 5 is a flowchart illustrating a method of a system to communicate voice data over a receiving device network 500. Some acts of the method 500 are performed in one or more communications devices. Some acts of the method 500 are performed in one or more receiving devices. Some acts of the method 500 are performed in computing server resources. Embodiments of the method may be understood in the context of FIGS. 1-4B wherein certain users, communications devices, receiving devices, computing server resources, and other features are cooperatively employed. In many cases, operations will execute concurrently in a plurality of devices discussed herein.

An embodiment of the process illustrated in FIG. 5 is discussed with respect to a first user and a second user. At some point during processing, the first user desires to engage in a voice conversation with the second user. The first user is associated with a first communications device, and the first communications device is proximate the first receiving device and may be configured to cooperate in a personal area network (PAN) with the first receiving device. The second user is associated with a second communications device, and the second communications device is proximate the second receiving device and may be configured to cooperate in a PAN with the second receiving device.

Processing in FIG. 5 begins in the devices at 502. Prior to processing and during processing, the first and second users may be in the same or different premises. In some cases, the users are watching a television program or listening to music passed from a receiving device to a presentation device. In some cases, a receiving device is in a standby mode and no programming content is being passed to a presentation device.

At 504, communications are initiated between communications devices and receiving devices. The process of initiation may be continuous as some communications devices enter proximity to receiving devices and some other communications devices leave proximity to receiving devices. In some cases, the initiation may merely be a receiving device detecting the proximity of a nearby communications device. In some cases, the initiation may include a receiving device forming a PAN such as an active peer-to-peer relationship with a communications device. One example of such an initiation is a Bluetooth connection between a receiving device and a communications device. Another example of such an initiation is a WiFi connection between a communications device and a receiving device.

In some cases, the initiation at 504 is part of a discovery process for a local receiving device network. In the discovery process, receiving devices that are part of a local receiving device network make available their identity to other receiving devices that are part of the local receiving device network. The identities may be broadcast in some embodiments. In other embodiments, a master receiving device interrogates the network, requests the identities of other receiving devices, and maintains a list or other structure of the identities. In some discovery embodiments, receiving devices also detect communications devices that are in proximity to the respective receiving device. In such cases, in addition to its own identity, each receiving device in the local network may publish or otherwise make available the identifier of each communications device associated with the respective receiving device. In this way, one or more receiving devices in a premises or other local receiving device environment will store an identity associated with each communications device coupled in the local receiving device network. The identity of a communications device may also include the identity of an associated user.

In some cases, the initiation at 504 may further be part of a discovery process for a wide receiving device network. After one or more local receiving device networks conduct a discovery process, at least one receiving device in each local receiving device network reports the identifiers associated with communications devices and an identifier of a respective proximate receiving device. The reporting may be made to a computing server resource. In this way a computing server resource may build and maintain an address book of a plurality of identifiers representing associations of users, communications devices, receiving devices, and premises.

At 504, the first user wants to begin a voice conversation with the second user. If not already associated, the first communications device associated with the first user forms an active PAN with its proximate first receiving device. For example, the Bluetooth transceivers of both the first communications device and the first receiving device are communicatively coupled. The first user may use the first communications device along with the first receiving device to create the call request to the second user. The first user may, for example, access an address book or other representation of user identities displayed on a presentation device or on the communications device. Upon access, the first user may select information related to the second user; for example, the proximity of the second user to a receiving device, the availability of the second user to receive an incoming call, the present location (e.g., premises) of the second user, or other information. The call request to the second user may then be prepared.

At 506, if the first and second receiving devices are part of the same local receiving device network, the local path from 506 is followed to 508a. At 508a, at least one communications path between the first and second receiving devices within the local receiving device network is determined based on one or more identifiers unique within the local receiving device network. The determined communications path may then be used to pass voice communications data between the first receiving device and the second receiving device. In some cases, there are other intervening receiving devices that forward the communications to and from the first and second receiving devices.

Alternatively at 506, if the first and second receiving devices are not part of the same local receiving device network, the remote path from 506 is followed to 508b. At 508b, the first receiving device proximate the first communications device associated with the first user will access a server such as the computing server resource 108 of FIG. 1. The first receiving device will request or otherwise retrieve one or more identifiers to facilitate contact with the second user through the second receiving device. The identifiers may include, for example, one or more of an Internet Protocol (IP) address, an account identifier, a premises identifier, a second receiving device identifier, or some other identifier. The one or more identifiers can be used to address data communications between the first receiving device proximate the first user's communications device and the second receiving device proximate the second user's communications device.

When processing begins at 510, the first receiving device proximate a first user is operating in a PAN with the first communications device associated with the first user. The first user has initiated a request for a voice conversation with the second user. The first receiving device is aware of one or more identifiers that can be used to direct communications to the second receiving device for passage to the second communications device and the second user. The first receiving device will retrieve information regarding the availability of the second user. The first receiving device may have a profile associated with the second user as discussed herein with respect FIGS. 4A and 4B and Table 1. Alternatively, the first user may access a profile associated with the second user stored in a computing server resource.

At 510, the first receiving device evaluates the information regarding the availability of the second user. Referring to Table 1, the information may include a fourth parameter to indicate whether the second user is busy, a fifth parameter to indicate when the second user will become available, a sixth parameter to indicate if the first user is permitted to request a conversation, a ninth parameter to indicate whether the second user is watching a program and can be interrupted, and other parameters.

If the second user is unavailable, processing passes to 512 where the first user can wait or terminate. If the first user waits for the second user to become available, processing in the first receiving device will wait at 514 and then pass back to 510. Alternatively, if the first user does not wait, then processing may terminate at 516.

When the first user is waiting at 514, the receiving device may draw parameters from a profile associated with the second user. The first receiving device may set a time as discussed with respect to a timers module 166 in FIG. 4A. For example, in some cases, the second user may be watching a television program or some other programming content delivery may be in progress to the second user, and the second user does not want to be disturbed. In this case, the first user may request a timer be set based on the predicted ending time of the programming being delivered to the second user. When the timer expires, the first receiving device may begin processing to begin the voice conversation.

If the second user is available at 510, processing passes to 518 wherein the first receiving device will attempt to begin communicating with the second receiving to make a call. In some cases, a set of default acts in the second receiving device will alert the second user to the call request. In other cases a profile associated with the second user will direct acts that alert the second user via at least one annunciator. For example, if the second receiving device is actively communicating programming content to a presentation device, the second receiving device may alert the second user through the presentation device with audio indicators, an on-screen-display (OSD) displaying information such as the identity of the first user, a pause in the programming content delivery, or some other alert. If the second communications device is in a standby mode or otherwise not delivering programming content, the second receiving device may wake up and begin delivering an alert to the incoming call request. Other indicators of the second receiving device include visual indicators such as LEDs illuminating, flashing, and the like, audio indicators sounding one or more tones, tactile device vibrating, or other indicators. Such indicators will encourage the second user to actively form a PAN between the second communications device and the second receiving device if such a communications path is not already enabled.

In still other embodiments, if for example the second receiving device is part of a local receiving device network, the second receiving device can provide alerts through various home or other building automation systems. In one case, the local receiving device network includes ZigBee devices that conform to a ZigBee protocol. The ZigBee devices may be directed by the second receiving device to flash lights in the premises, generate other tones, or take other actions to inform the second user of the incoming call request.

Alternatively, or in addition, to alerts carried out in the second receiving device, alerts to the incoming call from the first user may be passed or otherwise directed in the second communications device. The alerts may be visual, audio, or tactile as described herein.

If the second user accepts the incoming call, then the first and second user carry on a voice conversation at 520. Processing at 520 may continue for a long time. At 520, audio information is received by one or more of the first and second communications devices. The audio information, which is voice conversation data, is converted to digital data which is then passed via the PAN to the respective receiving device. The respective receiving device may or may not process the voice conversation digital data, and the voice conversation digital data is passed through zero or more intervening components and devices to the second receiving device, which may further perform processing.

In some cases, processing of the voice conversation digital data in the receiving devices may include encryption and decryption of the voice conversation digital data. The processing may alternatively include obfuscation, scrambling, or some other technique in one receiving device that is reversible in the other receiving device. Such processing may be used in wide receiving device network communications and local receiving device network communications.

When the voice conversation is completed, processing may be terminated at 522.

Figure 6:
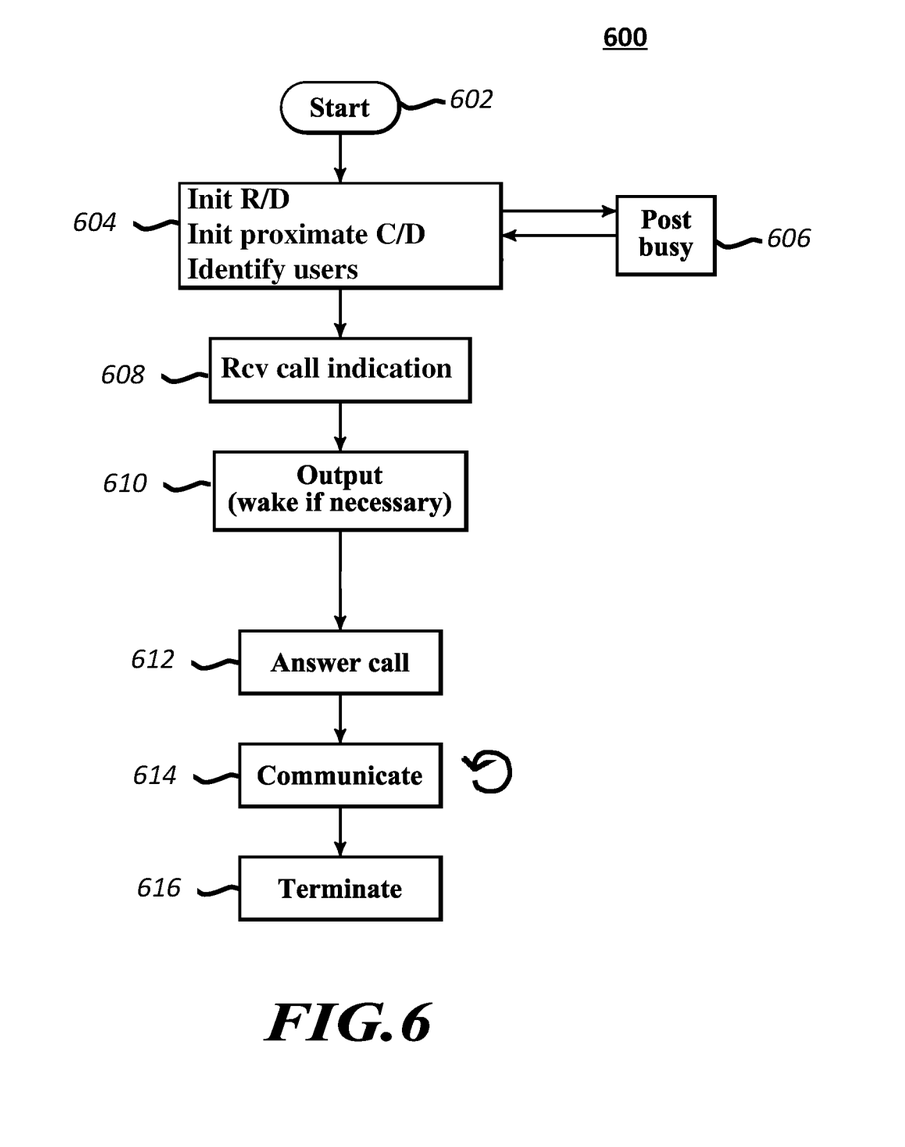
FIG. 6 is a flowchart illustrating a method of a system to communicate voice data over a receiving device network.

FIG. 6 is a flowchart illustrating a method of a system to communicate voice data over a receiving device network 600. The embodiment of FIG. 6 is discussed as in FIG. 5 wherein a first user desires to engage in a voice conversation with a second user. The first user is associated with a first communications device, and the first communications device is proximate the first receiving device and may be configured to cooperate in a personal area network (PAN) with the first receiving device. The second user is associated with a second communications device, and the second communications device is proximate the second receiving device and may be configured to cooperate in a PAN with the second receiving device. The method of FIG. 6 illustrates acts performed in the second receiving device.

At 602, processing begins in the second receiving device. At 604, the second receiving device is initialized, and the second communications device is detected. A PAN may or may not be formed between the second receiving device and the second communications device. Based on information stored in a profile in the second communications device or based on information received, for example from a user or from the second communications device, the second user may be identified.

At 606, information regarding the second receiving device, the second communications device, an in addition or alternative, information regarding the second user may be posted or otherwise made available to other devices in a local or wide receiving device network. In some circumstances, the status of the second user may indicate "unavailable."

At 608, the second receiving device, which has indicated "available," receives an indication from the first receiving device of an incoming call request. The first receiving device may be communicating from within a same local receiving device network or from a wide receiving device network.

The second receiving device will output an incoming call alert at 610. In some cases, the second receiving device is woken up from a standby mode before the call alert is output. Various mechanisms to alert the second user of the incoming call have been discussed herein. The mechanisms may be directed by a profile associated with the second receiving device. The profile may be received from the second communications device, manually entered or modified by a user, communicated from a computing server resource or some other source, or accessed, entered, or modified in some other way.

At 612, the call is answered. Answering the call may include forming an active communications PAN between the second receiving device and the second communications device.

At 614, the first user and the second user participate in a voice conversation. The respective communications devices and receiving devices generate, process, communicate, and consume the digital voice conversation data. Processing in 614 may last shorter than a few seconds or longer than many hours. Passing voice conversation data over a local receiving device network and in some cases also over a wide receiving device network may be carried out without using any cellular communications voice or data plan minutes.

When the voice conversation between the first and second users ends, processing may terminate at 616.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. Aspects of the embodiments can be modified and changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A first receiving device to receive multimedia programming, the first receiving device configured to output video data and audio data to at least one presentation device, the first receiving device configured to communicate voice data between the first receiving device and a second receiving device, comprising:
   a transceiver module having at least one communications circuit;
   a processor module coupled to the transceiver module, the processor module configured to:
      direct communications between the first receiving device and the second receiving device;
      direct communications between the first receiving device and at least one external device, the at least one external device having an audio input circuit and an audio output circuit;
      receive a call request from the at least one external device, the call request identifying the second receiving device;
      interrogate a repository; and
      receive a value associated with a time to wait before initiating communications with the second receiving device.

2. The first receiving device of claim 1 wherein the at least one communications circuit includes a wireless radio transceiver.

3. The first receiving device of claim 2 wherein the wireless radio transceiver follows a BLUETOOTH protocol.

4. The first receiving device of claim 2 wherein the wireless radio transceiver follows an IEEE wireless protocol.

5. The first receiving device of claim 1, wherein the processor module is configured to:
   interrogate a repository; and
   receiving from the repository a call availability status of a user associated with the second receiving device.

6. A receiving device method, comprising:
   receiving multimedia programming with a first receiving device;
   outputting video data and audio data corresponding to at least some of the received multimedia programming to at least one presentation device;
   receiving at the first receiving device a call request from at least one external device, the call request identifying a second receiving device;
   interrogating a repository; and
   receiving from the repository a value associated with a time to wait before initiating communications with the second receiving device;
   communicating voice data between the at least one external device and the first receiving device; and
   communicating at least some of the voice data between the first receiving device and a second receiving device.

7. The receiving device method of claim 6 wherein communicating voice data between the at least one external device and the first receiving device includes wirelessly communicating the voice data.

8. The receiving device method of claim 7 wherein wirelessly communicating the voice data includes wirelessly communicating the voice data according to a BLUETOOTH protocol.

9. The receiving device method of claim 7 wherein wirelessly communicating the voice data includes wirelessly communicating the voice data according to an IEEE wireless protocol.

10. The receiving device method of claim 6, comprising:
    interrogating a repository; and
    receiving from the repository a call availability status of a user associated with the second receiving device.

11. The receiving device method of claim 6 wherein the at least one external device is a wearable computing device.

12. A first multimedia programming receiving device arranged to communicate voice data between the first multimedia programming receiving device and a second multimedia programming receiving device, the first multimedia programming receiving device comprising:
    a first transceiver module arranged to receive incoming voice data from a first external device;
    a second transceiver module arranged to transmit the incoming voice data toward the second multimedia programming receiving device; and
    a processor coupled to the first and second transceiver modules, the processor configured to:
       receive a request from the first external device to communicate voice data, the voice data to be communicated through the second multimedia programming receiving device;
       interrogate a repository;
       receive a value associated with a time to wait before initiating communications with the second multimedia programming receiving device;
       direct communication of the incoming voice data from the first external device to the first multimedia programming receiving device via the first transceiver module; and
       direct communication of the incoming voice data from the first multimedia programming receiving device toward the second multimedia programming receiving device via the second transceiver module.

13. The first multimedia programming receiving device according to claim 12 wherein the second transceiver module is further arranged to receive outgoing voice data from the second multimedia programming receiving device, wherein the first transceiver module is further arranged to transmit the outgoing voice data toward the first external device, and wherein the processor is further configured to direct communication of the outgoing voice data from the second multimedia programming receiving device via the second transceiver module and direct communication of the outgoing voice data from the first multimedia programming receiving device to the first external device via the first transceiver module.

14. The first multimedia programming receiving device according to claim 12 wherein the first transceiver module operates according to a BLUETOOTH protocol or an IEEE wireless protocol.

15. The first multimedia programming receiving device according to claim 12 wherein the second transceiver module operates according to a local area network protocol or an Internet protocol.

16. The first multimedia programming receiving device according to claim 12 wherein the processor is configured to:
provide an indication of unavailability to receive voice data communications.

17. The first multimedia programming receiving device according to claim 12 wherein the processor is configured to:
delay communication of voice data the second multimedia programming receiving device provides an indication of availability.

18. The first multimedia programming receiving device according to claim 17 wherein the indication of availability is associated with an amount of time remaining in a presentation of multimedia content.

19. The first multimedia programming receiving device according to claim 12, comprising:
at least one annunciator arranged to illuminate, vibrate, or output a sound to indicate a request to communicate voice data.

20. The first multimedia programming receiving device according to claim 12 wherein the processor is configured to:
provide an indication when first external device is in proximity of the first multimedia programming receiving device.

* * * * *